Patented Sept. 28, 1937

2,094,573

UNITED STATES PATENT OFFICE 2,094,573

PRODUCTION OF POTASSIUM SULPHATE-AMMONIUM SULPHATE DOUBLE SALT

Karl J. Jacobi, Carlsbad, N. Mex., assignor to United States Potash Company, New York, N. Y., a corporation of New Mexico No Drawing. Application June 5, 1935, Serial No. 25,153

3 Claims. (Cl. 23—121)

This invention relates to the production of potassium sulphate and double salts containing the same, as well as methods for producing such salts and combinations.

Among the objects of the present invention are the production of double salts containing potassium sulphate having pronounced commercial utility, and methods of producing such double salts.

Further objects include new methods of producing potassium sulphate.

Other and further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention double salts of the potassium sulphate-ammonium sulphate type are produced. Such double salts are particularly exemplified by the double salt of potassium and ammonium sulphates having the formula $5K_2SO_4.(NH_4)_2SO_4$, which contains approximately 2.8% nitrogen and 46.95% $K_2O$.

Such double salts are particularly useful in and of themselves as for example for fertilizer purposes, or they may be employed for the production of substantially pure potassium sulphate.

For the production of the substantially pure potassium sulphate, the double salt is treated with potassium chloride, and the potassium sulphate thus produced is readily separated from the ammonium chloride which is formed in the reaction.

In the production of the double salt and of the potassium sulphate in accordance with the present invention, these products are obtained by reaction of such salts as potassium chloride and ammonium sulphate, both of which are available commercially and are less valuable materials than either the potassium sulphate itself or the double salt combinations produced in accordance with the present invention. The ammonium chloride, a by-product, is also a valuable salt. The reactions are desirably carried out in aqueous solution, and do not require the use of heat, although heat may be employed if desirable, particularly to shorten the time of reaction. By limiting the amount of water present during the reaction, separation of the desired salt is readily obtained, since the ammonium chloride produced in these reactions, as when potassium chloride and ammonium sulphate are reacted, is much more soluble than either the double salt referred to or the potassium sulphate, and an amount of water may thus be employed in carrying out the reactions which insures solubility of the ammonium chloride produced in the reaction, while leaving most of the potassium sulphate or of the potassium sulphate-ammonium sulphate double salt undissolved. These several features will be illustrated below by a specific example, particularly setting forth the production of the double salt $5K_2SO_4.(NH_4)_2SO_4$, and also the conversion of the latter into substantially pure potassium sulphate.

As exemplary of producing the double salt particularly referred to immediately above, the following is given. 94 parts by weight of potassium chloride is added to 230 parts by weight of water. At ordinary temperatures, the potassium chloride will not be completely dissolved, but this is of no importance in the present reaction. To the potassium chloride water solution in admixture, there is then added 100 parts by weight of ammonium sulphate, and the mixture is stirred until completion of reaction. The products of this reaction are the double salt $$5K_2SO_4.(NH_4)_2SO_4$$

and ammonium chloride. About 78% of the double sulphate is obtained in the solid form from this reaction, while the remaining 22% of the double sulphate is in solution, together with all of the ammonium chloride. The order of steps given in the example above is not critical, inasmuch as they may be reversed, i. e., the sulphate of ammonium may be dissolved first and the solid crystals of potassium chloride added, as in the manner described.

The double sulphate may, therefore, be readily separated from the solution, and the double sulphate may be washed if desired, the washings being added to the mother liquor if desired, and the double sulphate thus obtained in substantially pure form and containing not more than .50% of chlorine. The double salt may be dried and utilized commercially, for example, as a fertilizer, or in combination with other desired ingredients in the production of fertilizer compositions.

It should be pointed out that the products of reaction, including both the double salt and the ammonium chloride are more valuable than either the potassium chloride and ammonium sulphate which are utilized in producing these desirable reaction products. The double salt of $5K_2SO_4.(NH_4)_2SO_4$ is a definite chemical compound.

The mother liquor obtained from the second reaction may be re-used until saturated with ammonium chloride.

Instead of using the mother liquor as the medium for carrying out further production of double salt, the mother liquor may be treated in any desired way to recover the salts contained therein. It may, for example, be evaporated to substantial dryness, and due to the marked difference in specific gravity between the salts present therein, the specific gravity of the double sulphate being about 2.66, while that of the ammonium chloride is 1.53, the two salts may be separated gravimetrically, either in wet or dry condition. Or solvent action, such as by means of organic solvents having a selective action may be utilized to segregate these salts from each other.

Instead of separating the potassium sulphate from the ammonium sulphate, both contained in the double salt, this double salt may be used as is.

While the reaction has been illustrated above with the production of substantially pure double salts in yields of about 78% directly from the initial reaction medium, such yields may be increased, as for example, up to 85%, although in such cases the double salt will be contaminated with ammonium chloride, and it is considered more desirable, therefore, to conduct the reaction so that the substantially pure double salt is obtained from the first reaction. For the production of the substantially pure double salt $$5K_2SO_4.(NH_4)_2SO_4$$

as described above, the particular proportions of the reacting ingredients should be as given in the preferred example. However, these proportions may vary within desirable limits.

It has been emphasized above that the double salt obtained in accordance with this invention may be employed for fertilizer purposes. However, where desired, this double salt may be employed in the production of substantially pure potassium sulphate. For this purpose, the double salt may be treated with a substantially molecular proportion of potassium chloride, with reference to the ammonium sulphate in the double salt, the products obtained being potassium sulphate and ammonium chloride. Thus by using exact molecular equivalents and carrying out the reactions in aqueous solution, limiting the amount of water present desirably so that the ammonium chloride is all in solution, while the potassium sulphate is not, the potassium sulphate may be obtained in solid condition in a state of considerable purity. The production of the substantially pure potassium sulphate from the double sulphate can be carried out at ordinary atmospheric temperatures, without necessitating the employment of heat, although the latter may be utilized if desired.

The mother liquor from the second reaction in which the substantially pure potassium sulphate is obtained, may be utilized for the production of the substantially pure potassium sulphate in the second reaction, the necessary materials being added to this mother liquor for producing the desired reaction products. In such cases where the mother liquor is reused as the medium for further reaction, the concentration of the ammonium chloride should not be permitted to rise to such a point that it would crystallize out of solution under the conditions of reaction, and contaminate the potassium sulphate. Where the concentration of the ammonium chloride reaches a point where contamination in this way might be the result, the mother liquor can be evaporated to produce mixed crystals of potassium sulphate and ammonium chloride, and the latter may be used in combination, or more desirably may be separated by one of the methods described above in connection with the separation of the double salt from the ammonium chloride in the mixed product obtained by evaporation of the mother liquor from the first reaction.

While the reaction of the double salt with potassium chloride to produce substantially pure potassium sulphate has been emphasized, the double sulphate may, if desired, be reacted with other alkali metal halides to produce analogous reaction products, although if alkali metal salts are employed other than the potassium salts, the potassium sulphate will be contaminated with such other alkali metals and their compounds.

Having thus set forth my invention, I claim:

1. A process of producing $5K_2SO_4.(NH_4)_2SO_4$ which comprises reacting potassium chloride with ammonium sulphate in a saturated aqueous solution to yield a double salt of potassium and ammonium sulphates, and ammonium chloride, and recovering the double salt therefrom, the potassium chloride reactant approximating slightly less than the weight of the ammonium sulphate, and the amount of water for the solution being sufficient to retain all of the ammonium chloride in solution.

2. A process of producing $5K_2SO_4.(NH_4)_2SO_4$ which comprises reacting potassium chloride with ammonium sulphate in a saturated aqueous solution in proportions approximating 94 parts potassium chloride to 100 parts ammonium sulphate whereby to yield a double salt of potassium and ammonium sulphates, and ammonium chloride, and recovering the double salt therefrom, and the amount of water for the solution being sufficient to retain all of the ammonium chloride in solution.

3. A process of producing $5K_2SO_4.(NH_4)_2SO_4$ which comprises reacting potassium chloride with ammonium sulphate in a saturated aqueous solution to yield a double salt of potassium and ammonium sulphates, and ammonium chloride, and recovering the double salt therefrom, the potassium chloride reactant approximating slightly less than the weight of the ammonium sulphate, said aqueous solution being of a concentration to insure all the ammonium chloride being in solution.

KARL J. JACOBI.